United States Patent
Oh

(10) Patent No.: US 9,857,907 B2
(45) Date of Patent: Jan. 2, 2018

(54) METHOD AND DEVICE FOR ACCURACY ENHANCEMENT OF TOUCHSCREEN INPUT

(71) Applicant: Samsung Electronics Co., Ltd., Gyeonggi-do (KR)

(72) Inventor: Sanghyeok Oh, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 152 days.

(21) Appl. No.: 14/256,806

(22) Filed: Apr. 18, 2014

(65) Prior Publication Data

US 2014/0313148 A1    Oct. 23, 2014

(30) Foreign Application Priority Data

Apr. 19, 2013  (KR) .................. 10-2013-0043374

(51) Int. Cl.
*G06F 3/041* (2006.01)
*G06F 3/0488* (2013.01)

(52) U.S. Cl.
CPC ........ *G06F 3/0416* (2013.01); *G06F 3/04886* (2013.01); *G06F 2203/04101* (2013.01)

(58) Field of Classification Search
CPC ......... G06F 2203/04101; G06F 3/0416; G06F 3/04886

USPC .......................................... 345/156, 173–178
See application file for complete search history.

(56) References Cited

U.S. PATENT DOCUMENTS

| | | | |
|---|---|---|---|
| 2006/0103635 A1 | 5/2006 | Park | |
| 2007/0097236 A1 | 5/2007 | Yoo et al. | |
| 2008/0309631 A1* | 12/2008 | Westerman | G06F 1/3203 345/173 |
| 2010/0134444 A1* | 6/2010 | Yahata | G06F 3/042 345/175 |
| 2012/0249470 A1* | 10/2012 | Sugiura | G06F 1/1694 345/174 |

FOREIGN PATENT DOCUMENTS

| | | |
|---|---|---|
| KR | 10-0644650 | 11/2006 |
| KR | 10-0735561 | 6/2007 |

* cited by examiner

*Primary Examiner* — Ram Mistry

(57) ABSTRACT

Disclosed is a method of processing an input of a touch screen in an electronic device. The method includes detecting a pointing region indicated by a pointing means on the touch screen. The method also includes changing a selection number of input coordinates to be selected when the pointing region is changed. The method also includes calculating a corrected coordinate by using input coordinates stored in a memory as many as the changed selection number. The method also includes performing a function corresponding to the corrected coordinate.

17 Claims, 7 Drawing Sheets

METHOD AND DEVICE FOR ACCURACY ENHANCEMENT OF TOUCHSCREEN INPUT

CROSS-REFERENCE TO RELATED APPLICATION(S) AND CLAIM OF PRIORITY

The present application is related to and claims the benefit under 35 U.S.C. §119(a) of a Korean patent application filed on Apr. 19, 2013 in the Korean Intellectual Property Office and assigned Serial No. 10-2013-0043374, the entire disclosure of which is hereby incorporated by reference.

TECHNICAL FIELD

The present disclosure relates to an electronic device having a touch screen, and more particularly, to an electronic device which processes an input from a touch screen.

BACKGROUND

Recently, an electronic device may include a touch panel installed at a screen as an input unit, sense a user's input through a touch screen (i.e., a screen where the touch panel is installed), generate data in response to the sensing, and recognize a location on the touch screen corresponding to the input by processing data.

In the data processing operation, the electronic device may correct the location, for example, the coordinates on the touch screen, by using an interpolation algorithm or a noise-removing algorithm. In the correction process, the electronic device may remove a trembling phenomenon (called "jitter"). The jitter may occur in an electronic device having a touch panel of an electro-magnetic resonance (EMR). The following problem may occur by such a jitter. For example, even when the user holds the pen without movement, the corresponding pointer displayed on the touch screen may be trembled. Furthermore, the icon, which is not intended by the user, may be selected, and the application corresponding to the selected icon may be executed.

Furthermore, the jitter may not be removed according to the pointing region of the touch screen indicated by the pointing means such as a finger or a pen. Here, the pointing region may be a region to which the pointing means is touched or a region where the pointing means is hovering. Furthermore, the jitter may not be removed according to the depth. Here, the depth may refer to a distance between the touch screen and the pointing means such as a pen-point and the tip of a finger.

SUMMARY

To address the above-discussed deficiencies, it is a primary object to provide a method and a device for improving accuracy of an input by removing a jitter.

In accordance with an aspect of the present disclosure, a method is provided for processing an input of a touch screen in an electronic device. The method includes detecting a pointing region indicated by a pointing means on the touch screen. The method also includes changing a selection number of input coordinates to be selected when the pointing region is changed. The method also includes calculating a corrected coordinate by using input coordinates stored in a memory as many as the changed selection number. The method also includes performing a function corresponding to the corrected coordinate.

In accordance with another aspect of the present disclosure, an electronic device includes: a memory; a display unit having a touch screen; a touch screen controller configured to detect input coordinate by using raw data received from the touch screen; and a processor. The process is configured to store input coordinate inputted from the touch screen controller in the memory. The process is also configured to detect a pointing region indicated by a pointing means on the touch screen. The process is also configured to change, when the pointing region is changed, a selection number of the input coordinates to be selected. The process is also configured to calculate a corrected coordinate by using a number corresponding to the changed selection number among the input coordinates stored in the memory. The process is also configured to perform a function corresponding to the corrected coordinate.

In accordance with another aspect of the present disclosure, an electronic device includes: a memory which stores at least one application and a variable noise filter; a display unit having a touch screen; and a processor configured to access to the memory and execute the variable noise filter. The variable noise filter operates the processor to perform a function of detecting a pointing region indicated by a pointing means on the touch screen. The variable noise filter also operates the processor to perform a function of changing a selection number of input coordinates to be selected when the pointing region is changed. The variable noise filter also operates the processor to perform a function of calculating a corrected coordinate by using the input coordinates stored in the memory as many as a number corresponding to the changed selection number. The variable noise filter also operates the processor to perform a function of transmitting the corrected coordinate to the application.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Example embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

In the description below, the electronic device may be a smart phone, a tablet personal computer (PC), a notebook PC, a digital camera, a smart TV, a personal digital assistant (PDA), an electronic organizer, a desktop PC, a portable multimedia player (PMP), a media player such as an MP3 player, sound equipment, a smart wristwatch, a game console, and a home appliances having a touch screen (e.g., a refrigerator, a TV, and a washing machine).

Figure 1:
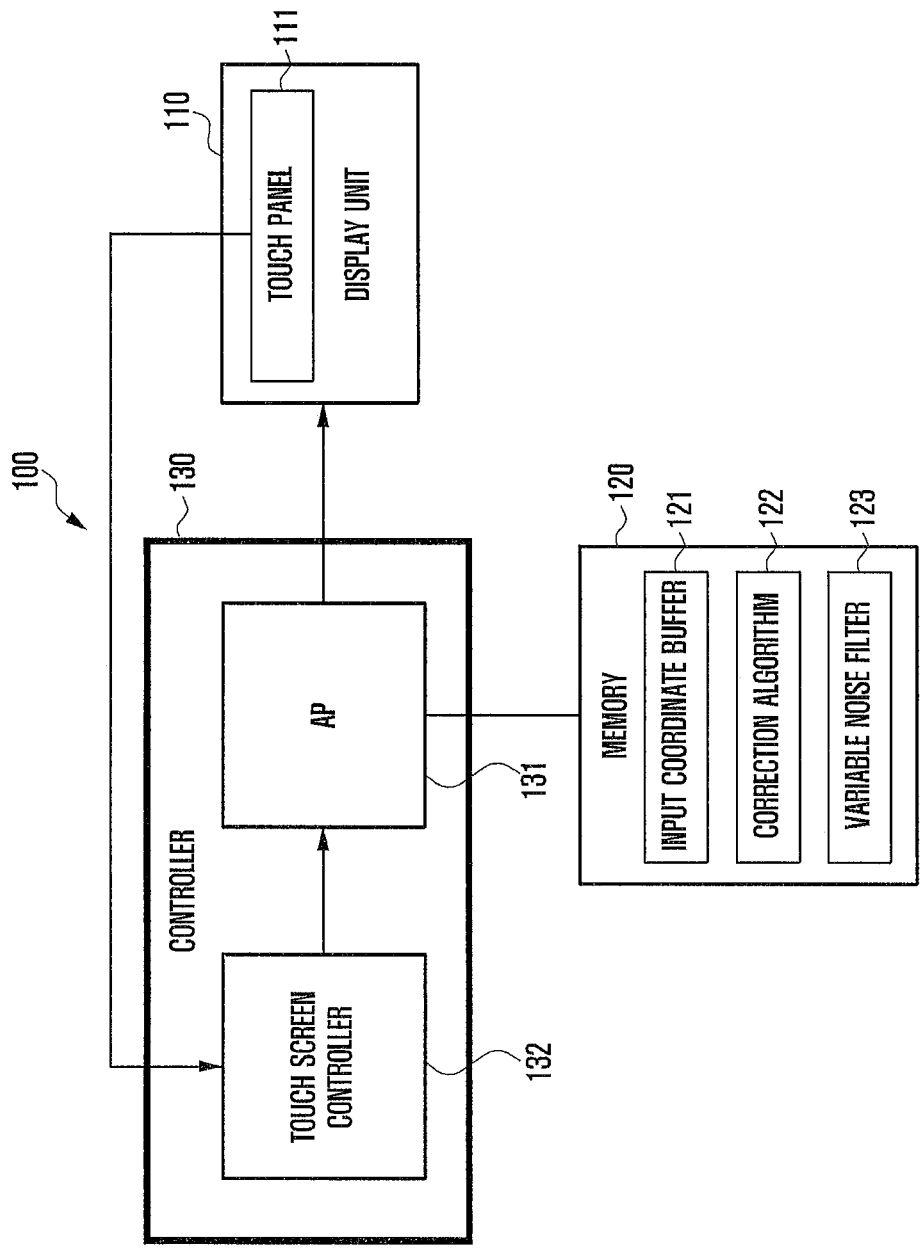
FIG. 1 illustrates a configuration of an electronic device according to an embodiment of the present disclosure.

FIG. 1 illustrates a configuration of an electronic device according to an embodiment of the present disclosure.

Referring to FIG. 1, the electronic device may include a display unit 110, a memory 120, and a controller 130.

The display unit 110 displays various information on the screen under control of the controller 130, such as, for example, an AP 131. For example, if the controller 130 processes (e.g., decodes) information and stores the processed information in the memory (e.g., a frame buffer) of the display unit 110, the display unit 110 may convert data stored in the frame buffer into analog signals and display the converted analog signals on the screen. The display unit 110 may be formed with a liquid crystal display (LCD), an active matrix organic light emitted diode (AMOLED), a flexible display, or a transparent display.

The touch panel 111 is installed on the display unit 110. In an embodiment, the touch panel 111 is implemented as an add-on type element or unit located on the display unit 110, and may be an on-cell type or an in-cell type which is inserted into the display unit 110. Furthermore, the touch panel 111 generates an input signal such as a touch event, an approach event, and a hovering event in response to a gesture such as a touch, a tab, a drag, and a flick of a pointing means such as a finger or a pen for the screen of the display unit 110, i.e., the touch screen, and converts the input signal into a digital signal (analog to digital (AD) conversion) to transmit the converted digital signal to the controller 130, such as, for example, a touch screen controller 132.

If the pointing means approaches the touch screen, the touch panel 111 generates an approach event in response to the approach. The approach event may include information indicating the movement and direction of the pointing means. If the pointing means hovers on the touch screen, the touch panel 111 generates a hovering event in response to the hovering, and transmits the hovering event to, for example, the touch screen controller 132. Here, the hovering event may include raw data, for example, one or more coordinates (x, y). If the pointing means touches the touch screen, the touch panel 111 generates a touch event in response to the touch. Here, the touch event may include raw data, for example, one or more coordinates (x, y).

Furthermore, the touch panel 111 may be a complex touch panel including a hand touch panel which senses a hand gesture and a pen touch panel which senses a pen gesture. Here, the hand touch panel is implemented with a capacitive type. Of course, the hand touch panel may also be implemented with a resistive type, an infrared type, or an ultrasonic type. Further, the hand touch panel generates an event not by only a hand gesture, but may generate an event by another object such as a conductive material which may change the capacitance. The pen touch panel such as a digitizer sensor substrate may be formed with an electromagnetic resonance (EMR) type. Accordingly, the pen touch panel may generate an event by a specially manufactured touch pen 140 to form a magnetic field. The pen touch panel may generate a key event. For example, if a key installed in the pen is pushed, the magnetic field generated in the pen coil is changed. The pen touch panel may generate a key event in response to the change of the magnetic field and transmit the key event to the touch screen controller 132.

The memory 120 stores data which is generated according to operation of the electronic device 100 or is received from an external through the communication unit (not shown) under control of the controller 130. The memory 120 may include a buffer as a temporary data storage unit. In an embodiment, the memory 120 may include an input coordinate buffer 121. For example, the AP 131 of the controller 130 may store the coordinates such as touch coordinates and hovering coordinates, which are received from the touch screen controller 132, in the input coordinate buffer 121. The input coordinate buffer 121 may manage the storage of the coordinates under control of the controller, such as, for example, the AP 131. For example, the input coordinate buffer 121 may store 4 coordinates, and may first delete the coordinates which are first stored. Further, when the coordinates are the hovering coordinates, the controller 130 may store the depth corresponding to corresponding hovering coordinates in the input coordinate buffer 121. Of course, the depth may be stored in a separate buffer. Further, the AP 131 of the controller 130 may determine the storage capacity of the input coordinate buffer 121. That is, the number of coordinates stored in the input coordinate buffer 121 may be changeable by the controller 130. Further, the buffer (e.g., the input coordinate buffer 121) may be separately provided in a storage space such as the AP 131, other than the memory 120.

The memory 120 may store various setting information for setting the user environment of the electronic device 100. For example, the memory 120 may store the selection number of the input coordinates for each pointing regions of the touch screen. Here, as described above, the pointing region may be a region to which the pointing means is touched or may be a region on which the pointing means hovers.

The jitter may be more severe in the outer side of the touch screen than in the central part. Hence, the pointing region setting information shown in Table 1 may be stored.

TABLE 1

| Pointing region | a number of input coordinates to be selected by the controller 130 (e.g., AP 131)(hereinafter 'selection number') |
|---|---|
| Central region | 4 |
| Outer region | 8 |
| Outermost region | 16 |
| Corner region | 32 |

Further, the memory 120 may store the selection number of the input coordinates (i.e., the coordinates stored in the input coordinate buffer 121). Here, the depth may means the distance between the touch screen and the pointing means such as a pen. As the distance between the touch screen and the pointing means increases, the jitter may get more severe. Hence, the depth setting information as shown in Table 2 may be stored.

TABLE 2

| Depth | Selection number of input coordinates |
|---|---|
| First setting range (0 < depth ≤ D1) | 4 |
| Second setting range (D1 < depth ≤ D2) | 8 |
| Third setting range (D2 < depth) | 16 |

Further, the memory 120 may store the selection number of the input coordinates corresponding to the pointing region and depth. For example, the pointing region & depth setting information as shown in Table 3 below may be stored.

TABLE 3

| Pointing region | Depth | Selection number of input coordinates |
|---|---|---|
| Central region | 0 < depth ≤ D1 | 4 |
|  | D1 < depth ≤ D2 | 4 |
|  | D2 < depth | 8 |
| Outer region | 0 < depth ≤ D1 | 8 |
|  | 1 < depth ≤ D2 | 16 |
|  | 2 < depth | 16 |
| Outermost region | 0 < depth ≤ D1 | 16 |
|  | 1 < depth ≤ D2 | 32 |
|  | 2 < depth | 32 |
| Corner region | 0 < depth ≤ D1 | 32 |
|  | 1 < depth ≤ D2 | 64 |
|  | 2 < depth | 64 |

Tables 1, 2 and 3 above are merely examples, and do not limit the scope of the present disclosure. That is, in Tables 1 and 3, it was described that the pointing region is divided into four parts, but the number of parts may be greater than or less than four. Further, it was described in Tables 2 and 3 above that the depth is divided into three parts, but the number of parts may be greater than or less than three. The selection number of the input coordinates may also be set to various values.

The memory 120 stores a booting program, one or more operating systems, and one or more applications. In an embodiment, the memory 120 may include a correction algorithm 122 for removing a jitter, and a variable noise filter 123. The correction algorithm 122 may be an embedded application or a third party application. Further, the correction algorithm 122 may be part of the configuration of the operating system. Further, in the embodiment of the correction algorithm, various well known algorithms such as an interpolation algorithm may be used to remove the jitter. The variable noise filter 123 may be a program which averages the plurality of coordinates stored in the input coordinate buffer 121.

In an embodiment, the variable noise filter may include a routine which detects the pointing region, a routine which determines whether the pointing region is changed, a routine which changes the selection number of input coordinates when the pointing region is changed (e.g., the selection number is changed from 4 to 8 when the pointing region is changed from the central region to the outer region), a routine which reads recent input coordinates of the changed selection number from the input coordinate buffer 121, a routine of calculating F(input coordinates which have been read), i.e., corrected coordinates (may be called as output coordinates), and a routine of outputting the calculated corrected coordinates (=F(input coordinates which have been read)) to the application (e.g., the application which is currently being executed).

Here, F( ) is an arbitrary function. For example, F( ) may be a function of calculating the average of input coordinates which have been read. Further, "the application which is currently being executed" may be an application which provides a feedback of a result to the user in response to the user's input (e.g., the touch input of the pointing means). Here, the feedback may include at least one of a visual feedback (e.g., the result is displayed on the screen), an audible feedback (e.g., an output of music), or a tactile feedback (e.g., a vibration). Hence, the application may perform a function (e.g., displaying a pointer) corresponding to the corrected coordinates (output coordinates).

Further, the variable noise filter 123 may include a routine of detecting the depth, a routine of determining whether the depth is changed, a routine of changing the selection number of the input coordinates when the depth is changed (e.g., the selection number of input coordinates is changed from 4 to 8 when the depth is changed from the first setting range to the second setting range), a routine of reading the recent input coordinates of the changed selection number from the input coordinate buffer 121, a routine of calculating F (coordinates which have been read), and a routine of outputting the calculated corrected coordinates (output coordinates) to the application.

Further, the variable noise filter 123 may include a routine of detecting the pointing region and the depth, a routine of determining the selection number of the input coordinates based on the detected pointing region and the detected depth (e.g., the selection number is determined as 4 when the pointing region is the central region and the depth is the first setting range), a routine of reading the recent input coordinates of the determined selection number from the input coordinate buffer 121, a routine of calculating F (coordinates which have been read), and a routine of outputting the calculated corrected coordinates (output coordinates) to the application.

Further, the variable noise filter 123 may be an embedded application or a third party application. Further, the correction algorithm 122 may be part of the configuration of the operating system.

The memory may include a main memory and a secondary memory. The main memory may be implemented with a RAM, and the like. The secondary memory may be implemented with a RAM, ROM, or a flash memory, and the like. The main memory may store various programs loaded from the secondary memory, such as a booting program, an operating system, and applications. If the battery power is supplied to the controller 130, first, the booting program is loaded to the main memory. Such a booting program loads the operating system to the main memory. The operating system loads the applications to the main memory. The controller 130 such as the AP 131 access to the main memory and decodes the commands (routine) of the program, and executes the function (e.g., variable noise filtering) according to the decoding result. That is, various programs are loaded to the main memory and operate as a process.

The controller 130 controls an overall operation of the electronic device 100 and a signal flow between inner parts of the electronic device 100, processes data, and controls a power supply to the above components from the battery. The controller 130 may include an application processor (AP) 131 and a touch screen controller 132.

If a hovering event is transmitted from the touch panel, the touch screen controller 132 recognizes the hovering. The touch screen controller 132 may determine the hovering region on the touch screen in response to the hovering, and calculate the hovering coordinates (x, y) in the hovering region. The touch screen controller 132 may transmit the calculated hovering coordinates to, for example, the AP 131. Here, the hovering coordinates may be indicated in pixel units. For example, when the resolution of the screen is 640 (number of horizontal pixels)*480 (number of vertical pixels), the x-axis coordinates is (0, 640), and the y-axis coordinates is (0, 480). When the hovering coordinates are received from the touch screen controller 132, the AP 131 may determine that the pointing means has been hovered on the touch screen, and when the hovering coordinates are not received from the touch panel 111, the AP 131 may determine that the hovering of the pointing means has been released from the touch screen. Further, when the hovering coordinates are changed and the variation exceeds a preset movement threshold, the AP 131 determines that the movement of the pointing means has occurred. The AP 131 may calculate the location variation (dx, dy) of the pointing means and the moving speed of the pointing means in response to the movement of the pointing means. The AP 131 may determine the user's gesture for the touch screen as one of a drag, a flick, a pinch-in, a pinch-out, a boundary-in, and a boundary-out, based on the hovering coordinates, the hovering release of the pointing means, the movement of the pointing means, the location variation of the pointing means, and the moving speed of the pointing means. Here, the boundary-in may be a gesture by which the pointing means moves from the edge part (e.g. a bezel) of the touch screen to the touch screen. The boundary-out may be a gesture by which the pointing means moves from the touch screen to the edge part. Further, the hovering event may include sensing information for calculating the depth. For example, the hovering event may include three-dimensional coordinates (x, y, z). Here, the value "z" may means the depth.

If a touch event is transmitted from the touch panel 111, the touch screen controller 132 may recognize a generation of a touch. The touch screen controller 132 may determine the touch region in the touch screen in response to the touch, and calculate the touch coordinates (x, y) in the touch region. The touch screen controller 132 may transmit the calculated touch coordinates to, for example, the AP 131. Here, the touch coordinates may be indicated in pixel units. When the touch coordinates are received from the touch screen controller 132, the AP 131 determines that the pointing means has been touched on the touch panel 111, and when the touch coordinates are not received from the touch panel 111, the AP 131 determines that the touch of the pointing means has been released from the touch panel 111. Further, if the touch coordinates are changed and the change amount exceeds the preset movement threshold, the AP 131 determines that the movement of the pointing means has occurred. The AP 131 may calculate the location variation (dx, dy) of the pointing means and the moving speed of the pointing means in response to the movement of the pointing means. The AP 131 may determine the user's gesture for the touch screen as one of a multi-touch, a tap, a double tap, a long tap, a tap & touch, a drag, a flick, a press, a pinch-in, a pinch-out, a boundary-in, and a boundary-out, based on touch coordinates, the touch release of the pointing means, the movement of the pointing means, the location variation of the pointing means, and the moving speed of the pointing means.

The AP 131 may execute various programs stored in the memory 120. In an embodiment, the AP 131 may execute a variable noise filter 123. The variable noise filter 123 may also be executed by a processor other than the AP 131, for example, by a central processing unit (CPU).

The controller 130 may further include various processors other than the AP 131. For example, the controller 130 may include one or more CPUs. Further, the controller 130 may include a graphic processing unit (GPU). Further, when the electronic device 100 includes a mobile communication module such as a 3-generation mobile communication module, a 3.5-generation mobile communication module, or a 4-generation mobile communication module, the controller may further include a communication processor (CP). Further, when the electronic device includes a camera, the controller 130 may further include an image signal processor (ISP). The above-described processors may be integrated as one package where two or more independent cores such as a quad-core are formed as a single integrated circuit. For example, the AP 131 may have been integrated as one multi-core processor. The above-described processors such the AP and the ISP may have been integrated as one chip (SoC: System on Chip). Further, the above-described processors such as the AP and the ISP may have been packaged with a multi-layer.

The pen 140 is an accessory of the electronic device 100, which may be detachable from the electronic device 100, and may include a penholder, a penpoint, a coil which is arranged inside the penholder and generates a magnetic field, and a button for changing the magnetic field. The coil of the pen 140 may form a magnetic field around the penpoint. The touch panel may sense the magnetic field and generate an event corresponding to the magnetic field.

Further, the electronic device 100 may further include components, which have not been mentioned above, such as a mobile communication module, a short range communication module (e.g., a Wi-Fi module, a Bluetooth module, and a near field communication (NFC) module), a broadcast reception module (e.g., a DMB module), a speaker, a microphone, an earjack, a vibration motor, a camera, an acceleration sensor, a proximity sensor, an illumination sensor, and a GPS reception module.

Figure 2:
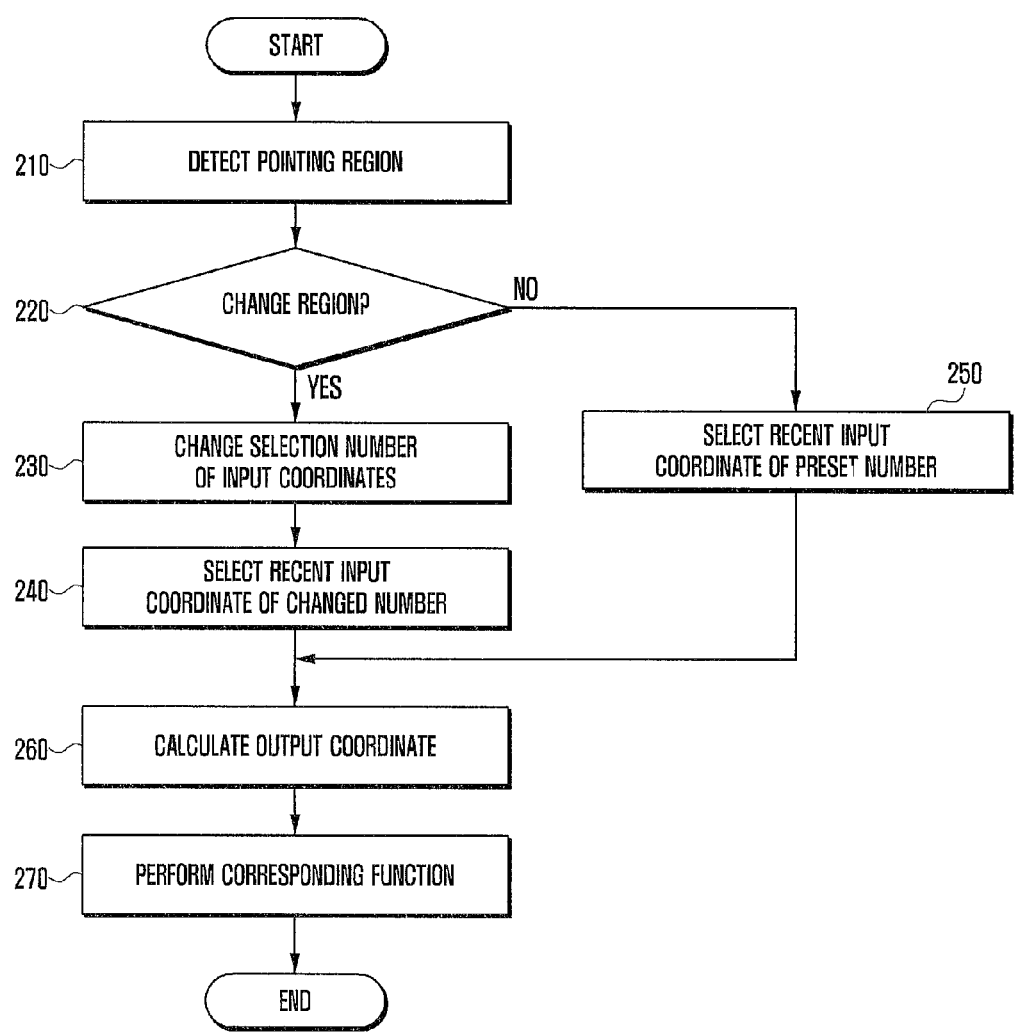
FIG. 2 illustrates an example of a process of processing input coordinate for removing a jitter according to an embodiment of the present disclosure.
Figure 3:
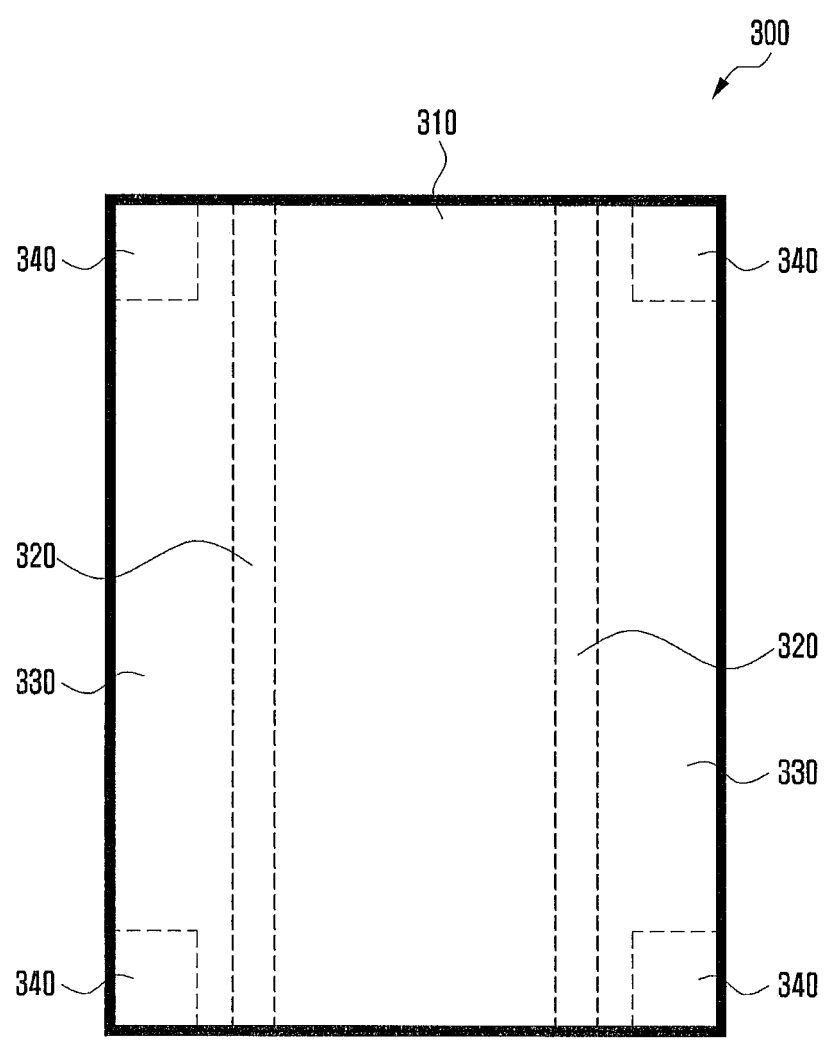
FIG. 3 illustrates an example of region division of a touch screen.

FIG. 2 illustrates an example of a process of processing input coordinate for removing a jitter according to an embodiment of the present disclosure. FIG. 3 illustrates an example of region compartment of a touch screen.

Referring to FIG. 2, at operation 210, the controller 130 may detect a pointing region through the touch panel 111. Referring to FIG. 3, the touch screen 300 may be classified into a central region 310, an outer region 320, an outermost region 330, and a corner region 340. The controller 130 receives an event from the touch panel 111, calculates a current input coordinate, "Input_current" by using the received event, and stores the calculated Input_current in the input coordinate buffer 121. Further, the controller 130 determines the pointing region, "PR(point region)_current" corresponding to the calculated input coordinate Input_current. For example, when the calculated input coordinate Input_current belongs to the central region 310, the controller 130 determines the central region 310 as a pointing region.

At operation 220, the controller 130 determines whether to change the pointing region. For example, the controller reads the previous input coordinate Input_previous from the input coordinate buffer 121. Here, the previous input coordinate Input_previous may be one of input coordinates which are stored before the input coordinate Input_current. For example, the previous input coordinate Input_previous may be an input coordinate which is stored immediately before the input coordinate Input_current. The controller 130 checks the pointing region PR_previous corresponding to the previous input coordinate Input_previous. When the PR_current and the PR_previous are identical, the controller 130 determines that the pointing region has not changed. When the PR_current is different from the PR_previous, the controller 130 determines that the pointing region has changed.

When the PR_current is different from the PR_previous, at operation 230, the controller 130 changes the selection number of the input coordinates. In such a changing process, the controller 130 may refer the pointing region setting information according to Table 1. At operation 240, the controller 130 selects the recent input coordinates of the changed number from the input coordinate buffer 121. When the PR_current is identical with the PR_previous, at operation 250, the controller 130 selects the recent input coordinates of a preset number from the input coordinate buffer 121.

At operation 260, the controller 130 calculates the corrected coordinates (output coordinates) by using input coordinates selected at operation 240 or 250. For example, the controller 130 may calculate the corrected coordinates (output coordinates) by averaging the selected input coordinates. At operation 270, the controller 130 may perform a function (e.g., pointer indication) corresponding to the corrected coordinates (output coordinates).

Figure 4:
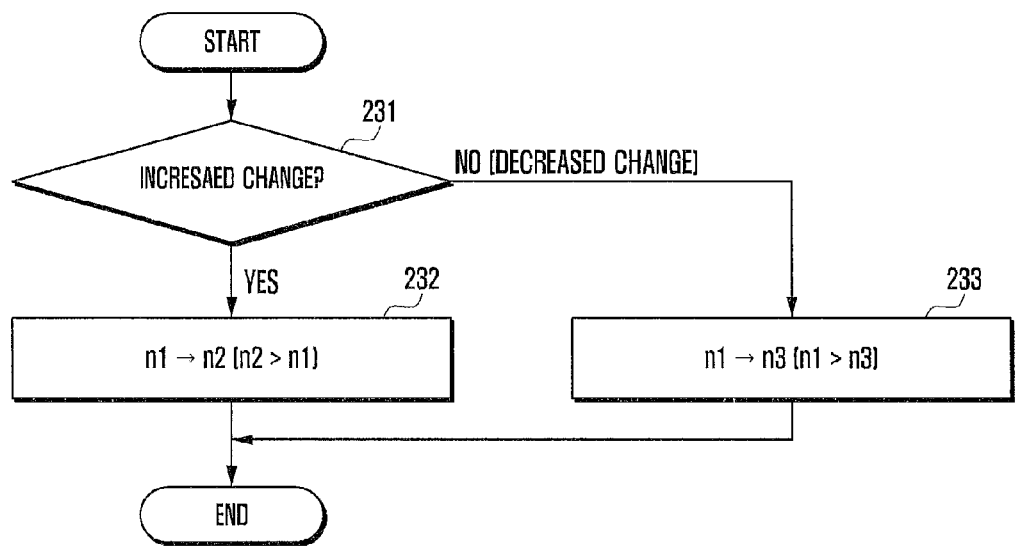
FIG. 4 illustrates an example of a process (i.e., operation S230) of changing the selection number of the input coordinates.

FIG. 4 illustrates an example of a process of changing (i.e., operation S230) the selection number of the input coordinate.

Referring to FIG. 4, when the PR_current is different from the PR_previous, at operation 231, the controller 130 determines whether the selection number of the input coordinates is changed to increase. When the pointing region is changed (e.g., the pointing region is changed from the central region 310 to the outer region 320) as the pointing location (e.g., the pointing coordinates) of the pointing means moves from the central part of the touch screen to the outer side of the touch screen, the controller 130 determines that the selection number is changed to increase. When the pointing region is changed (e.g., when the pointing region is changed from the outer region 320 to the central region 310) as the pointing location of the pointing means is moved from the outer side of the touch screen to the central part of the touch screen, the controller 130 determines that the selection number is changed to decrease.

When it is determined that the selection number is changed to increase, the controller 130 may increase the selection number of the input coordinates from n1 (preset number) to n2, at operation 232. In this increase process, the controller 130 may refer the "pointing region setting information" according to Table 1. For example, when the pointing region is changed from the central region 310 to the outer region 320, the controller 130 may increase the selection number of the input coordinates from 4 to 8.

When it is determined that the selection number is changed to decrease, the controller 130 may decrease the selection number of the input coordinates from n1 to n3, at operation 233. In this decrease process, the controller 130 may refer the "pointing region setting information" according to Table 1. For example, when the pointing region is changed from the outer region 320 to the central region 310, the controller 130 may decrease the selection number of the input coordinates from 8 to 4.

Figure 5:
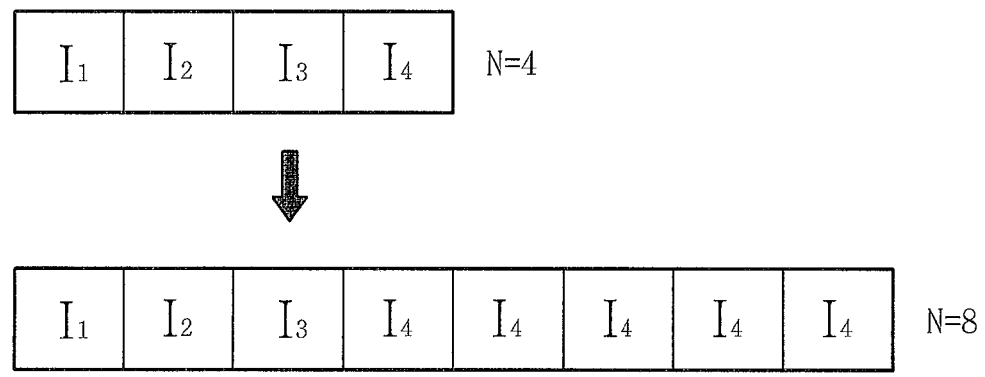
FIG. 5 illustrates an example of an input coordinate selection process according to an increase change.

FIG. 5 illustrates an example of an input coordinate selection process according to an increase change.

Referring to Table 1 and FIG. 5, before the increased change, it is assumed that the pointing region is the central region 310, and thus the selection number of the input coordinates is set to 4. It is assumed that I1, I2, I3, and I4 among the input coordinates stored in the input coordinate buffer 121 are recently stored input coordinates. It is assumed that I4 is the latest (the most recent) stored input coordinate among I1, I2, I3, and I4. Under this assumption, if the pointing region is changed from the central region 310 to the outer region 320, the controller 130 increases the selection number of the input coordinates from 4 to 8. In response to the increased change, the controller 130 selects 8 input coordinates. In an embodiment, the controller 130 selects recently stored four input coordinates I1 I2, I3, and I4 among input coordinates stored in the input coordinate buffer 121, and repeatedly selects the most recently stored input coordinate I4 as much as the lacked number (i.e., 4=8(n3)−4(n1)). Then, the controller 130 calculates output coordinates (=F(I1, I2, I3, I4, I4, I4, I4, I4)). Here, F( ) may be a function of calculating the average of I1, I2, I3, I4, I4, I4, I4, and I4.

Figure 6:
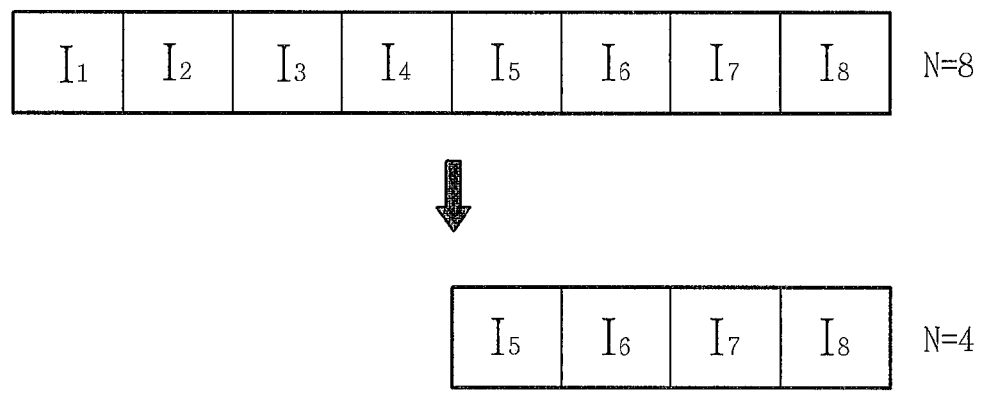
FIG. 6 illustrates an example of an input coordinate selection process according to a decrease change.

FIG. 6 illustrates an example of an input coordinate selection process according to a decreased change.

Referring to Table 1 and FIG. 6, before the decreased change, it is assumed that the pointing region is the outer region 320, and thus the selection number of the input coordinates is set to 8. It is assumed that I1, I2, I3, I4, I5, I6, I7, and I8 are recently stored input coordinates among the input coordinates stored in the input coordinate buffer 121. It is also assumed that I5, I6, I7, and I8 are input coordinates which are lately (i.e. recently) stored compared to other input coordinates among I1, I2, I3, I4, I5, I6, I7, and I8. Under this assumption, if the pointing region is changed from the outer region 320 to the central region 310, the controller 130 decreases the selection number of the input coordinates from 8 to 4. The controller 130 selects four input coordinates in response to the decreased change. That is, the controller 130 selects the recently stored I5, I6, I7, and I8 among I1, I2, I3, I4, I5, I6, I7, and I8. Then, the controller 130 calculates output coordinates (=F(I5, I6, I7, I8)). Here, F( ) may be a function of calculating the average of I5, I6, I7, and I8.

Figure 7:
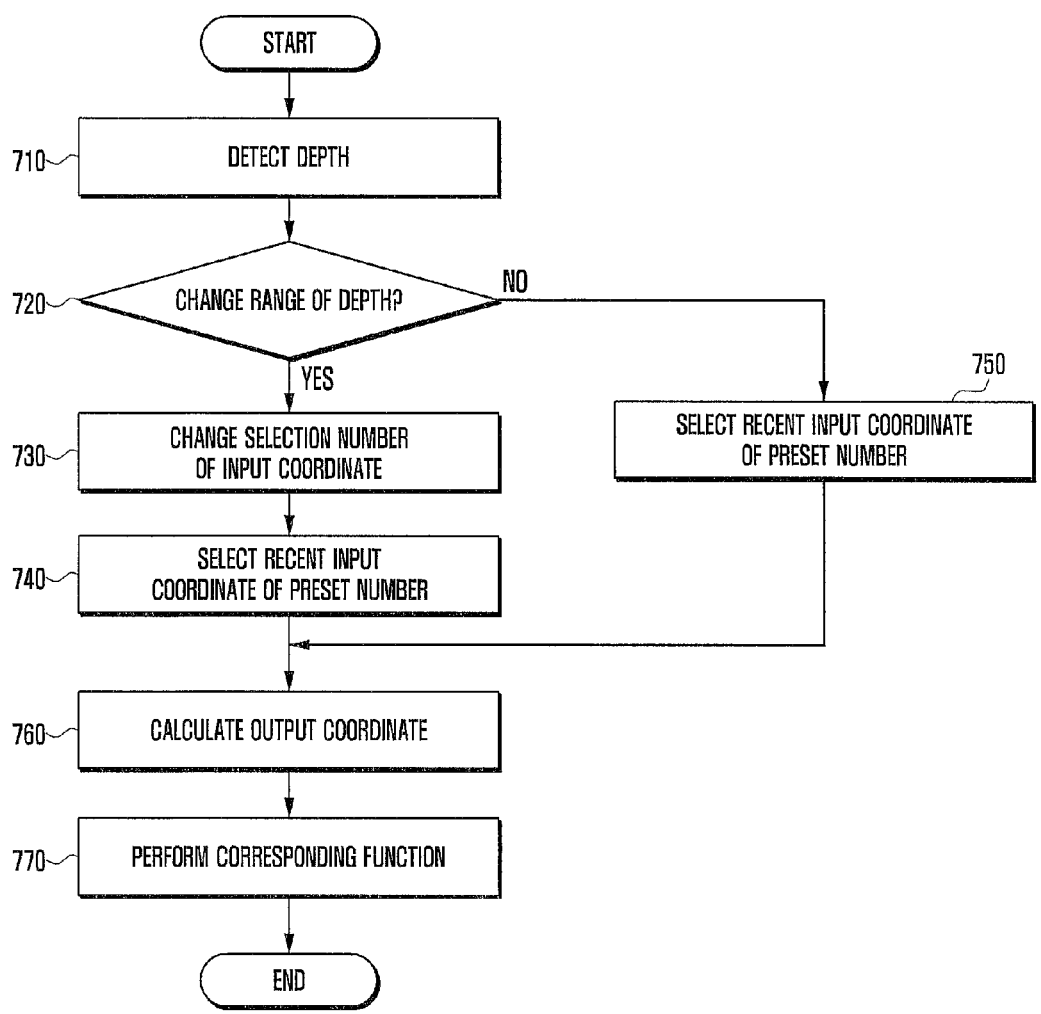
FIG. 7 illustrates an example of a process of processing input coordinate according to another embodiment of the present disclosure.

FIG. 7 illustrates an example of a process of processing input coordinate according to another embodiment of the present disclosure.

Referring to FIG. 7, at operation 710, the controller 130 may detect the depth through the touch panel 111. The controller 111 may receive a hovering event from the touch panel 111, calculate the current input coordinate Input_current and the current depth D_current by using the received hovering event, and store the current input coordinate Input_ current and the current depth D_current in the input coordinate buffer 121. Here, the current depth D_current may be stored in another buffer.

At operation 720, the controller 130 determines whether to change the depth. For example, the controller 130 reads the previous depth D_previous of the previous input coordinate Input_previous from the input coordinate buffer 121. Here, the previous input coordinate Input_previous may be one of input coordinates which are stored before the input coordinate Input_current. For example, the previous input coordinate Input_previous may be an input coordinate which is stored immediately before the input coordinate Input_current. The controller 130 checks the setting range to which the previous depth D_previous belongs. Further, the controller checks the setting range to which the current depth D_current belongs. When two setting ranges are identical, the controller 130 determines that the range of the depth is not changed. When the two setting ranges are different, the controller 130 determines that the range of the depth is changed.

When the two ranges are different, at operation 730, the controller 130 changes the selection number of the input coordinates. In such a changing process, the controller 130 may refer the "depth setting information" according to Table 2. At operation 740, the controller 130 selects the recent input coordinates of the changed number from the input coordinate buffer 121. For example, referring to Table 2 and FIG. 5, if the depth is changed from the first setting range to the second setting range, the controller 130 increases the selection number of the input coordinates from four to eight. The controller selects eight input coordinates in response to the increased change. In an embodiment, the controller 130 selects recently stored four input coordinates I1, I2, I3, and I4 among input coordinates stored in the input coordinate buffer 121, and repeatedly selects the most recently stored input coordinate I4 as much as the lacking number (i.e., 4=8(n3)−4(n1)). As another example, if the depth is changed from the second setting range to the first setting range, the controller 130 decreases the selection number of the input coordinates from 8 to 4. The controller 130 selects four input coordinates in response to the decreased change. That is, the controller 130 selects recently stored I5, I6, I7, and I8 among I1, I2, I3, I4, I5, I6, I7, and I8.

When the two setting ranges are identical, at operation 750, the controller 130 selects recent input coordinates of a preset number from the input coordinate buffer 121.

At operation 760, the controller 130 calculates the corrected coordinate (output coordinate) by using input coordinates selected at operation 740 or 750. For example, the controller 130 may calculate the corrected coordinate (output coordinate) by averaging the selected input coordinates. At operation 770, the controller 130 may perform a function (e.g., pointer indication) corresponding to the corrected coordinate (output coordinate).

As described above, according to the embodiments of the present disclosure, the selection number of the input coordinates may be changed depending on the change of the pointing region and/or the depth range. Accordingly, a jitter may be removed regardless of the pointing region and/or depth range. Further, the accuracy of the input may be improved by removing the jitter. For example, if the user holds a pen without movement, the pointer displayed on the touch screen may be displayed without a shake. Further, as the pen moves, even if the pointing region is changed (e.g., the pointing region is changed from an outer region where a jitter is severe to a central region where a jitter is relatively weak, or vice versa), the displayed pointer may be smoothly moved without stopping. Further, the pointing location is a location desired by user, and thus the user-desired application function may be executed.

The foregoing method of the present disclosure may be implemented in an executable program command form by various computer means and be recorded in a non-volatile computer readable recording medium. In this embodiment, the non-volatile computer readable recording medium may include a program command, a data file, and a data structure individually or a combination thereof. In the meantime, the program command recorded in the non-volatile computer readable recording medium may be specially designed or configured for the present disclosure or be known to a person having ordinary skill in a computer software field to be used. The non-volatile computer readable recording medium includes magnetic media such as a hard disk, a floppy disk, a magnetic tape, or any other similar and/or suitable magnetic media, optical media such as a Compact Disc Read Only Memory (CD-ROM), a Digital Versatile Disc (DVD), or any other similar and/or suitable optical media, a magneto-optical media such as a floptical disk or any other similar and/or suitable magneto-optical media, and a hardware device such as a ROM, RAM, flash memory, or any other similar and/or suitable hardware device. Further, the program command includes a machine language code created by a complier and a high-level language code executable by a computer using an interpreter. The foregoing hardware device may be configured to be operated as at least one software module to perform an operation of the present disclosure.

According to an electronic device for processing an input of a touch screen of the present disclosure, accuracy of an input may be improved by removing a jitter.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method of processing an input of a touch screen in an electronic device, the method comprising:
    detecting a pointing region indicated by a pointing means on the touch screen;
    repeatedly performing a storage operation of input coordinates of the pointing region as many as a number of times designated corresponding to a position of the pointing region, wherein the pointing region comprises one or more coordinates (x, y);
    changing the number of times of the storage operation when the pointing region is changed;
    calculating output coordinates by using input coordinates stored in a memory as many as the changed number of times, wherein calculating output coordinates comprises:
        when the number of times of the storage operation increases from a first number to a second number, selecting recently inputted input coordinates among the input coordinates stored in the memory, and repeatedly storing the selected input coordinates in the memory as many as a difference number between the first number and the second number; and
        calculating an average of the stored input coordinates as the output coordinates; and
    performing a function corresponding to the output coordinates.

2. The method of claim 1, wherein the changing of the number of times of the input coordinates comprises:

increasing the number of times of the storage operation, when the pointing region is changed as a pointing location of the pointing means is moved from a central side of the touch screen to an outer side of the touch screen; and decreasing the number of times of the storage operation, when the pointing region is changed as the pointing location of the pointing means is moved from the outer side of the touch screen to the central side of the touch screen.

3. The method of claim 1, wherein the calculating of the output coordinates comprises:
when the number of times of the storage operation is decreased from the first number to a third number, selecting recently stored input coordinates corresponding to the third number among the input coordinates stored in the memory; and
calculating an average of the selected recent input coordinates as the output coordinates.

4. The method of claim 1, wherein the pointing region is a region to which the pointing means is touched or a region where the pointing means hovers.

5. The method of claim 1, further comprising:
detecting a depth between the pointing means and the touch screen,
wherein the changing of the selection number of times of the input coordinates comprises changing the selection number of times of the input coordinates based on the detected depth.

6. An electronic device comprising:
a memory;
a display unit comprising a touch screen;
a touch screen controller configured to detect input coordinates by using raw data received from the touch screen; and
a processor configured to detect a pointing region indicated by a pointing means on the touch screen, control to repeatedly perform a storage operation of input coordinates of the pointing region inputted from the touch screen as many as number of times designated corresponding to a position of a pointing region in the memory, change, when the pointing region is changed, the number of times of the storage operation, calculate output coordinates by using the input coordinates stored in the memory, and perform a function corresponding to the output coordinates, when the number of times of the storage operation is decreased from a first number to a third number, select recent stored input coordinates corresponding to the third number among the input coordinates stored in the memory, and calculate an average of the selected recent input coordinates as the output coordinates, wherein the pointing region comprises one or more coordinates (x, y).

7. The electronic device of claim 6, wherein the processor is further configured to:
increase the number of times of the storage operation when the pointing region is changed as a pointing location of the pointing means is moved from a central side of the touch screen to an outer side of the touch screen; and
decrease the number of times of the storage operation when the pointing region is changed as the pointing location of the pointing means is moved from the outer side of the touch screen to the central side of the touch screen.

8. The electronic device of claim 6, wherein the processor is further configured to:
select, when the number of times of the storage operation increases from a first number to a second number, recently inputted input coordinates among the input coordinates stored in the memory, and repeatedly store selected input coordinates in the memory as many as a difference number between the first number and a second number; and calculate an average of the stored input coordinates as the output coordinates.

9. The electronic device of claim 6, wherein the pointing region is a region to which the pointing means is touched or a region where the pointing means hovers.

10. The electronic device of claim 6, wherein the processor is further configured to detect a depth between the pointing means and the touch screen, and changes the selection number of times of the input coordinates based on the detected depth.

11. The electronic device of claim 6, wherein the touch screen comprises an electromagnetic induction type touch panel.

12. The electronic device of claim 6, wherein the processor comprises an application processor.

13. An electronic device comprising:
a memory configured to store at least one application and a variable noise filter;
a display unit comprising a touch screen; and
a processor configured to access to the memory and execute the variable noise filter,
wherein the variable noise filter is configured to operate the processor to perform a function of detecting a pointing region indicated by a pointing means on the touch screen, a function of repeatedly performing a storage operation of input, coordinates of the pointing region as many as number of times designated corresponding to a position of the pointing region, wherein the pointing region comprises one or more coordinates (x, y), a function of changing the number of times of the storage operation when the pointing region is changed, a function of calculating output coordinates by using the input coordinates stored in the memory as many as the changed number of times, and a function of transmitting the output coordinates to the application, select, when the number of times of the storage operation increases from a first number to a second number, recently inputted input coordinates among the input coordinates stored in the memory, and repeatedly store the selected input coordinates in the memory as many as a difference number between the first number and the second number, and calculate an average of the stored input coordinates as the output coordinates.

14. The electronic device of claim 13, wherein the variable noise filter is configured to operate the processor to:
increase the number of times of the storage operation when the pointing region is changed as a pointing location of the pointing means is moved from a central side of the touch screen to an outer side of the touch screen; and
decrease the number of times of the storage operation when the pointing region is changed as the pointing location of the pointing means is moved from the outer side of the touch screen to the central side of the touch screen.

15. The electronic device of claim 13, wherein the variable noise filter is configured to operate the processor to:
select, when the number of times of the storage operation is decreased from a first number to a third number, recent input coordinates among the input coordinates stored in the memory as many as the third number; and calculate an average of the selected recent input coordinates as the output coordinates.

16. The electronic device of claim 13, wherein the pointing region is a region to which the pointing means is touched or a region where the pointing means hovers.

17. The electronic device of claim 13, wherein the processor is further configured to detect a depth between the pointing means and the touch screen, and changes the selection number of the input coordinates based on the detected depth.

* * * * *